United States Patent [19]

Jack

[11] 3,863,562

[45] Feb. 4, 1975

[54] MACHINE FOR CONTINUOUS BONDING OF FABRICS TO THERMOPLASTIC MATERIAL

[75] Inventor: William Jack, West Kilbride, Scotland

[73] Assignee: Jax Products (Engineering) Limited, Kilwinning, Ayrshire, England

[22] Filed: Nov. 13, 1973

[21] Appl. No.: 415,299

[30] Foreign Priority Application Data
Nov. 15, 1972 Great Britain............... 52749/72

[52] U.S. Cl............. 100/93 RP, 100/154, 100/211, 156/499, 156/582
[51] Int. Cl........................ B30b 5/04, B30b 15/34
[58] Field of Search .......................... 100/151–154, 100/38, 118–120, 210, 211; 156/582, 583, 499

[56] References Cited
UNITED STATES PATENTS

| 978,234 | 12/1910 | Taylor | 100/154 X |
| 2,459,295 | 1/1949 | Skoog | 100/211 X |
| 2,960,147 | 11/1960 | Ferrell | 100/211 UX |
| 3,367,261 | 2/1968 | Kashiwagi | 100/153 X |
| 3,580,795 | 5/1971 | Eichenlaub | 156/583 |

Primary Examiner—Peter Feldman

[57] ABSTRACT

A press for the continuous bonding of a layer of textile fabric to another layer embodying thermoplastic polymeric material, said press including a roller, means for rotating the roller, a flat resilient pad forming a nip with the roller, means for feeding the layers in superposition through said nip and means for heating the layers on their way to the nip.

4 Claims, 3 Drawing Figures

MACHINE FOR CONTINUOUS BONDING OF FABRICS TO THERMOPLASTIC MATERIAL

This invention relates to a press for the continuous bonding of a layer of textile fabric to a layer of thermoplastic polymeric material or to another layer of textile fabric coated continuously or locally in spots with thermoplastic polymeric material. The composite material so produced may be used, among other purposes, for the production of lapels of jackets.

To effect such bonding it is necessary to feed the two layers continuously through a heating device to means for applying sufficient pressure to the layers to bond them firmly together. The thermoplastic material must be heated to a sufficient temperature to assure that it attains the necessary plasticity to embed the fibres of the textile material in the softened thermoplastic material, and the pressing operation must be carefully controlled. Thus we have found that if a pair of nip rollers is used to apply the pressure, a line contact pressure is obtained which is so high that there is a tendency for the softened thermoplastic material to be forced through the fabric.

With a view to overcoming this difficulty, the invention provides a press for the continuous bonding of a layer of textile fabric to another layer embodying thermoplastic polymeric material, said press including a roller, means for rotating the roller, a flat resilient pad forming a nip with the roller, means for feeding the layers in superposition through said nip and means for heating the layers on their way to the nip. The pad may be spring loaded towards the roller or it may be a bag filled with pressurized air.

By the use of the roller and the pad, the high line pressure contact is eliminated and the pressure can be easily adjusted in the case of an air bag to satisfy the loading requirements for different types of fabric.

Two embodiments of the invention are illustrated in the accompanying diagrammatic drawings in which.

Figure 1:
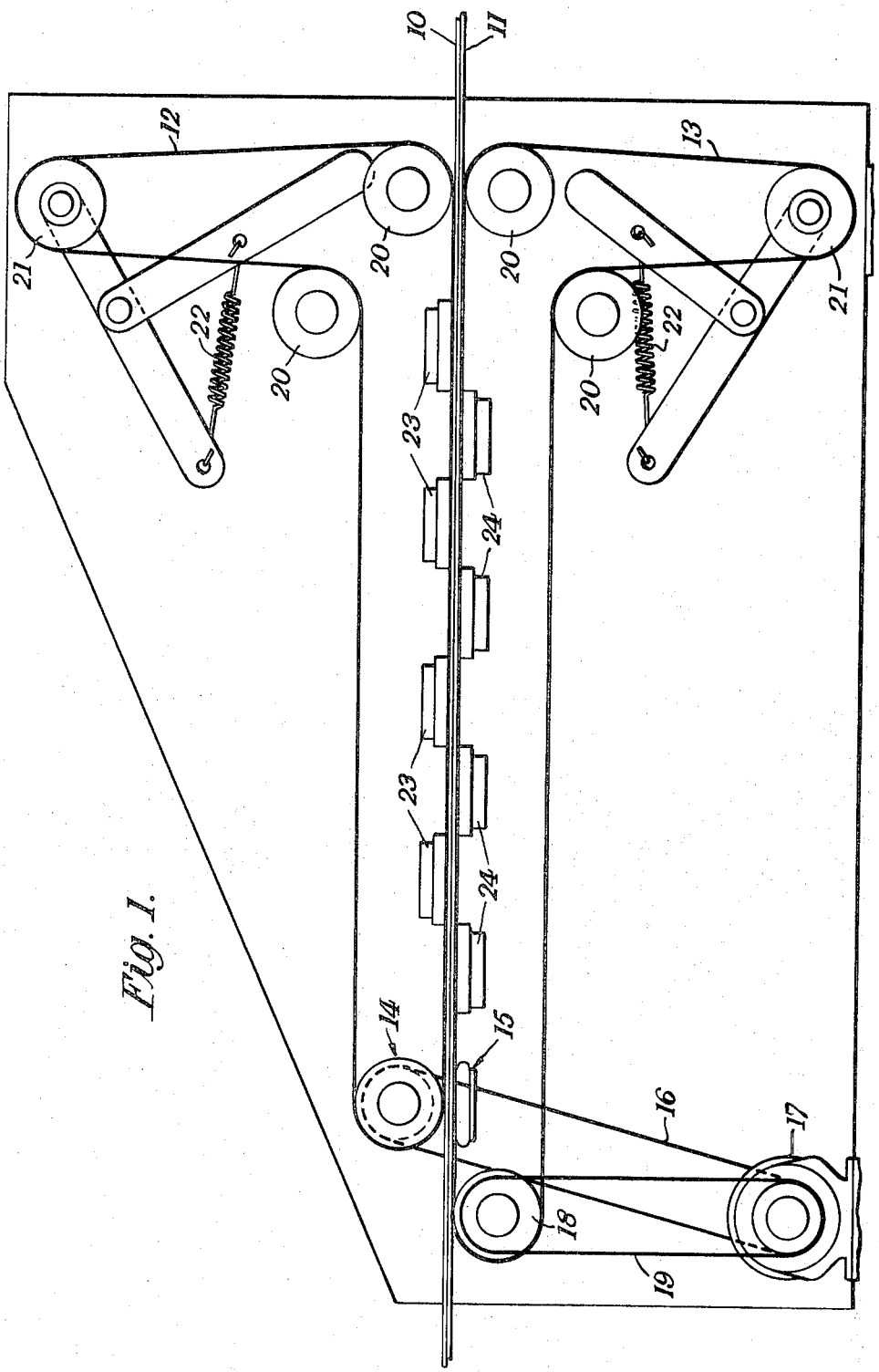
FIG. 1 is a side elevation of a press according to the invention.
Figure 2:
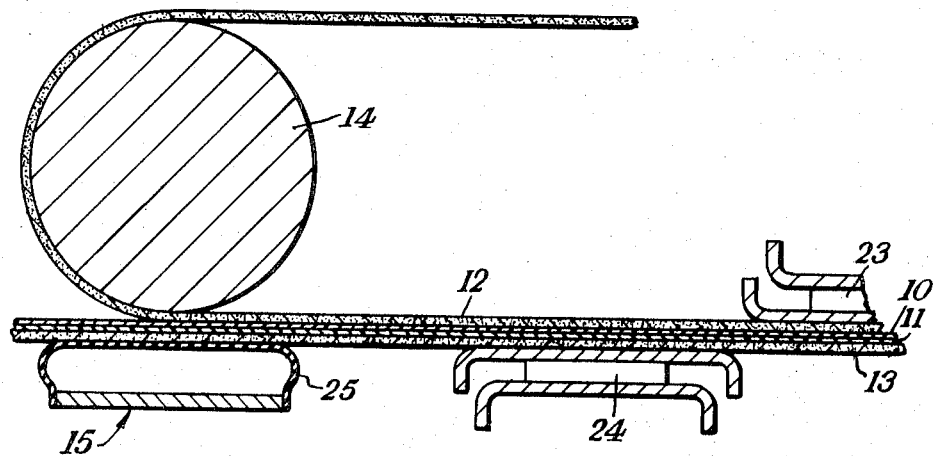
FIG. 2 is a sectional view on a larger scale showing the roller and the pad.

As shown in FIGS. 1 and 2 a layer 10 of textile fabric and a layer 11 of thermoplastic polymeric material, or of textile fabric coated continuously or locally in spots with thermoplastic polymeric material, are fed horizontally by the opposed horizontal runs of upper and lower conveyor belts 12 and 13 of polytetrafluoroethylene to the nip between a roller 14 and a flat resilient pad 15. The roller 14 is driven by a belt 16 from a motor 17 and serves to drive the upper belt 12. A drive roll 18 of the lower belt 13 is driven from the motor 17 by a belt 19.

The belts 12 and 13 extend around guide rolls 20 and tensioning rolls 21 having tensioning springs 22. On their way to the nip the layers 10, 11 pass a series of heaters 23, 24 which engage alternatively the upper and lower belts 12, 13 and which serve to raise the thermoplastic material to the required bonding temperature. The horizontal runs of the belts 12, 13 part beyond the nip to permit of discharge of the bonded laminate.

Figure 3:
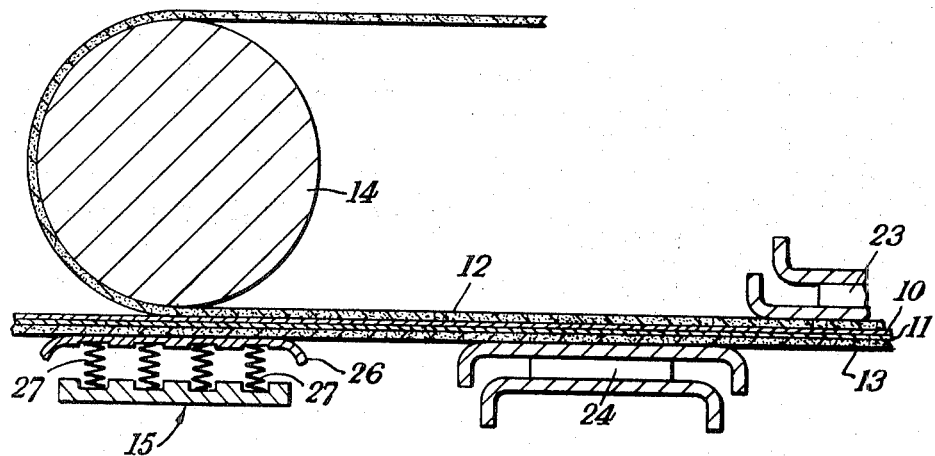
FIG. 3 is a view similar to FIG. 2 showing a modified embodiment.

In the construction shown in FIGS. 1 and 2 the pad 15 is a bag 25 inflated by pressurized air. In the construction shown in FIG. 3 the pad 15 is a plate 26 urged towards the roller 14 by springs 27.

What I claim as my invention and desire to secure by Letters Patent is:

1. A press for the continuous bonding of a layer of textile fabric to another layer embodying thermoplastic polymeric material, said press including a roller, means for rotating the roller, a flat resilient pad forming a nip with the roller, means for feeding the layers in superposition through said nip and means for heating the layers on their way to the nip.

2. A press as claimed in claim 1, wherein the pad is a bag filled with pressurised air.

3. A press as claimed in claim 1, wherein the pad is spring loaded towards the roller.

4. A press as claimed in claim 1, wherein the feeding means is constituted by opposed horizontal runs of a pair of conveyor belts.

* * * * *